United States Patent [19]

Sato et al.

[11] Patent Number: 5,331,029
[45] Date of Patent: Jul. 19, 1994

[54] RESIN FOR BONDING POLYARYLENE SULFIDE AND ADHESIVE

[75] Inventors: Hiroyuki Sato, Fukushima; Kazuhiro Watanabe, Tokyo; Toshiya Watanabe, Saitama, all of Japan

[73] Assignee: Kureha Kagaku Kogyo Kabushiki Kaisha, Tokyo, Japan

[21] Appl. No.: 75,925

[22] Filed: Jun. 14, 1993

Related U.S. Application Data

[63] Continuation of Ser. No. 875,331, Apr. 29, 1992, abandoned.

[30] Foreign Application Priority Data

Apr. 30, 1991 [JP] Japan .................. 3-126649
Feb. 19, 1992 [JP] Japan .................. 4-069820

[51] Int. Cl.$^5$ ............................................. C08K 5/34
[52] U.S. Cl. ......................... 524/94; 525/437; 525/537; 528/354; 528/359; 528/364; 528/377; 528/388
[58] Field of Search ............... 528/377, 388, 364, 354, 528/359; 525/537, 437; 524/94

[56] References Cited

U.S. PATENT DOCUMENTS 3,869,434 3/1975 Campbell et al. .................. 260/79.1

FOREIGN PATENT DOCUMENTS 0394933 4/1990 European Pat. Off. .
0432561 11/1990 European Pat. Off. .
0508705 6/1992 European Pat. Off. .
2470780 12/1979 France .
484115 2/1973 Japan .
484116 2/1973 Japan .

OTHER PUBLICATIONS

Daccord et al. Polymer Bulletin 4, 459 (1981).
Daccord et al. Polymer Bulletin 6, 477 (1982).
Heitz, Makromol. Chem., Macromol. Symp. 26, 1 (1989).
Hüthig & Wepf Verlag, *Macromolecular Chemistry and Physics*, vol. 191, pp. 815-828, (1990).

*Primary Examiner*—Melvyn I. Marquis
*Assistant Examiner*—Helen F. Lee
*Attorney, Agent, or Firm*—Sughrue, Mion, Zinn, Macpeak & Seas

[57] ABSTRACT

A resin for bonding polyarylene sulfides is disclosed, comprising a copolymer wherein a main constituent element of the repeating unit of the copolymer is —A—Z—R—Z—, wherein —Z— is an ester linkage; A is an arylene sulfide oligomer component block comprising one or more arylene groups; and R is an organic compound residue formed by removing one atom or one group attached to each of two carbon atoms among carbon atoms constituting either an aliphatic main chain or an aromatic ring and has at most a molecular weight corresponding to an oligomer, but is different from A. An adhesive comprising the resin and a pyrrolidone solvent is also disclosed.

4 Claims, No Drawings

RESIN FOR BONDING POLYARYLENE SULFIDE AND ADHESIVE

This is a continuation of application No. 07/875,331 filed Apr. 29, 1992, now abandoned.

FIELD OF THE INVENTION

This invention relates to a heat-resistant bonding resin to be applied to molded polyarylene articles and an adhesive for polyarylene sulfides.

BACKGROUND OF THE INVENTION

It is known that crystalline polyarylene sulfides have high heat resistance. However, the maximum utilization of such property in combination with other materials can not be made as yet. This is because a suitable adhesive capable of bonding molded articles of crystalline polyarylene sulfides is not found as yet. In other words, crystalline polyarylene sulfides have resistance to solvents, and hence an appropriate solvent which can sufficiently dissolve crystalline polyarylene sulfides have not been found.

In this connection, α-chloronaphthalene is known as a solvent capable of dissolving the crystalline polyarylene sulfides when the crystalline polyarylene sulfides are polyphenylene sulfides. However, the smell thereof is not proper for industrial uses. Further, N-methylpyrrolidone can dissolve phenylene sulfide oligomers, but can not dissolve phenylene sulfide polymers.

When the polyarylene sulfides are non-crystalline copolymers comprising an m-dihalobenzene and a p-dihalobenzene, tetrahydrofuran and chloroform are known as solvents [see, JP-B-52-12239 (the term "JP-B" as used herein means an "examined Japanese patent publication")]. However, the heat resistance is poor because the copolymers are non-crystalline.

Further, concentrated sulfuric acid is known as a solvent when the polyarylene sulfides are polyphenylene sulfide ketones. However, it is the present condition that it is industrially difficult to remove the concentrated sulfuric acid. Furthermore, a mixed solvent of 1,2,4-trichlorobenzene and p-cholorophenol is known. However, there are problems with regard to smell and toxicity.

Accordingly, there has been proposed a method wherein a polyarylene sulfide is dispersed in a dispersion medium, the dispersion medium is then removed and the polyarylene sulfide is heated to a temperature of not lower than the crystalline melting point of the polyarylene sulfide. However, a film having a uniform thickness can not be obtained, and moreover a thin film can not be obtained by this method.

SUMMARY OF THE INVENTION

Accordingly, an object of the present invention is to provide a resin which can be formed into a thin film, has heat resistance and can bond molded articles of polyarylene sulfides.

Another object of the present invention is to provide an adhesive for polyarylene sulfides.

Still another object of the present invention is to provide a resin capable of bonding molded articles having such a structure that at least a surface layer thereof is mainly composed of a crystalline polyarylene sulfide.

The present invention provides a resin for bonding polyarylene sulfides, which comprises a co-polymer wherein a main constituent element of the repeating unit of the copolymer is —A—Z—R—Z—, wherein —Z— is an ester linkage; A is an arylene sulfide oligomer component block comprising one or more arylene groups; and R is an organic residue formed by removing one atom or one group attached to each of two carbon atoms among carbon atoms constituting either an aliphatic main chain or an aromatic ring and has at most a molecular weight corresponding to an oligomer, but is different from A.

DETAILED DESCRIPTION OF THE INVENTION

Preferred examples of the arylene group which constitutes an arylene sulfide oligomer component block A in the repeating unit represented by —A—Z—R—Z— in the copolymer include the following groups.

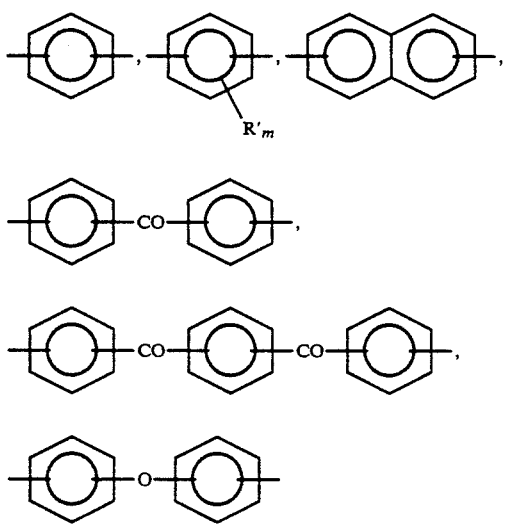

More preferred are the following groups.

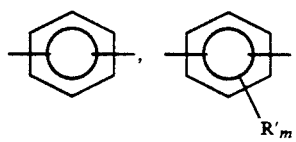

Particularly, p-phenylene sulfide is preferred. In the above formulae, m represents an integer of 1 to 4; and R' represents preferably at least one member selected from the group consisting of an alkyl group having not more than 6 carbon atoms, an alkoxy group having not more than 6 carbon atoms, a phenyl group, a carboxyl group, a cyano group, and a nitro group.

R is an organic residue formed by removing one atom or one group attached to each of two carbon atoms among carbon atoms constituting either an aliphatic main chain or an aromatic ring and has at most a molecular weight corresponding to an oligomer, but is different from the arylene sulfide oligomer component block. Suitable examples of R include a component block mainly composed of an aromatic oligoester and an aliphatic oligoester, a component block mainly composed of an aromatic oligoester and an aliphatic oligoether, and a residue formed by removing two hydrogen atoms from both terminals of the main chain of a paraffin having a molecular weight of about 60 to 200. The weight ratio of the aromatic oligoester to the aliphatic oligoester or the aliphatic oligoether is not critical but is preferably in the range of from 80/20 to 20/80, more preferably from 70/30 to 30/70.

The melt viscosity of the copolymer of the present invention is not particularly limited but is preferably 10 to 5000 poises, more preferably 30 to 3000 poises, particularly preferably 50 to 1000 poises. The term "melt viscosity" as used herein refers to a melt viscosity measured at a frequency of 10 rad/sec, a strain of 10% and a temperature of 20° C. higher than the crystalline melting point of the copolymer obtained with DSC (differential scanning calorimeter) according to the measurement method described in the Examples described hereinafter by using a viscoelasticity measuring apparatus (DYNAMIC SPECTROMETER, manufactured by Rheometrics).

The copolymer can be obtained, for example, by the methods described in French Patent 2,470,780 and Lothar Frend & Watter Heitz, *Makromol. Chem.*, 191, 815–828 (1990). R which constitutes the copolymer can be obtained, for example, by the methods described in JP-B-48-4115 and JP-B-48-4116. Another preferred method for preparing the copolymer is briefly illustrated below, but the method for preparing the copolymer according to the present invention is not limited thereto.

First step: depolymerization reaction step

First, an alkali metal sulfide is reacted with a polyarylene sulfide having a repeating unit represented by —(Ar—S)—(wherein —Ar— represents an arylene group bonded to a sulfur atom in the adjacent repeating unit at the para-position thereof with respect to the sulfur atom) in a polar organic solvent to effect depolymerization.

The polyarylene sulfide which is used usually has a content of the above-described repeating unit of at least 70% by weight, preferably at least 80% by weight, particularly preferably at least 90% by weight. When the content of the repeating unit is too low, the heat resistance of the resulting polymer which constitutes an adhesive is deteriorated. Suitable examples of the arylene group include the following groups.

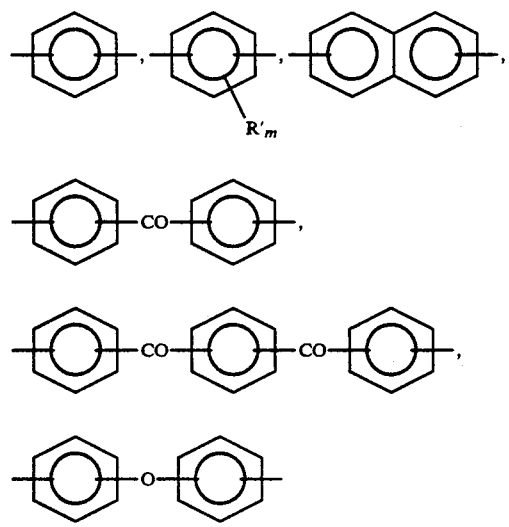

More preferred are the following groups.

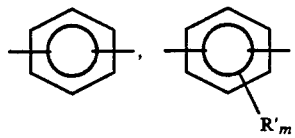

wherein R' and m are as defined above.

The polyarylene sulfides used in the depolymerization of the present invention can be prepared by conventional methods, for example, methods wherein an alkali metal sulfide and a dihalogen-substituted aromatic compound are polymerized by heating in a polar organic solvent, such as N-methylpyrrolidone, particularly preferably in the presence of water, as disclosed in U.S. Pat. Nos. 3,919,177 and 4,645,826. A crosslinked branched structure may be somewhat introduced into the polymer by adding a small amount of a polyhalogenated aromatic compound having at least three halogen atoms, such as trichlorobenzene, to the polymerization mixture and copolymerizing it. The thus-prepared polyarylene sulfide may be separated from the reaction mixture, but the reaction mixture as formed may be used as a part of the component to be subjected to depolymerization. It is desirable that both terminals of the polyarylene sulfide are in the form of —SM (wherein M is an alkali metal atom). Thus, it is desirable that an acid treatment is not carried out.

Examples of the polar organic solvent which can be used in the depolymerization of the present invention include N-alkylpyrrolidones such as N-methylpyrrolidone, 1,3-dialkyl-2-imidazolidinones, tetraalkylureas, aprotic organic amides represented by hexaalkylphosphoric acid triamides and mixtures thereof. These solvents can be preferably used from the viewpoint of high reaction stability.

Examples of the alkali metal sulfide which can be preferably used in the depolymerization of the present invention include lithium sulfide, sodium sulfide, potassium sulfide and mixtures thereof. These alkali metal sulfides can be used in the form of a hydrate or an aqueous mixture, or in an anhydrous form. Further, alkali metal sulfides in situ prepared from an alkali metal hydrosulfide and an alkali metal hydroxide in the reaction system can also be used.

It is considered that the depolymerization proceeds as shown in the following reaction formulae and there are formed compounds mainly composed of an oligomer, at least one terminal of which is terminated by an alkali metal thiolate group.

 (I)

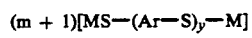

 (II)

 (III)

In the above formulae, M is a hydrogen atom when an acid treatment is carried out, and M is an alkali metal atom when the acid treatment is not conducted; Ar is an arylene group; X is a halogen atom; y is a number of 3 to 50; m is a number smaller than n; and $y=n/(m+1)$. In the above formulae, y represents a number of the repeating units and is preferably 3.5 to 40. When y exceeds 50, the resulting bonding resin is poor in flexibility as well as poor in solubility in solvents, while when y is smaller than 3, the heat resistance of the resin is deteriorated. Further, there is a possibility that X in the starting materials in the above reaction formulae (II) and (III) is reacted with $M_2S$ to form $MS-(Ar-S)_n-M$ which is the starting material in the reaction formula (I).

A preferred method for preparing an oligomer having an alkali metal thiolate group includes a method comprising depolymerizing a mixture comprising:

(A) a water-containing polar organic solvent containing 0.1 to 10 mole of water per kg of the polar organic solvent;

(B) 0.1 to 5 primary mole of a polyarylene sulfide per kg of the polar organic solvent (the number of the term "primary mole" as used herein refers to a molar number obtained by calculating the sum of the atomic weight of the atoms which constitute one repeating unit $-(Ar-S)-$ of the polyarylene sulfide as one gram molecule); and (C) 0.02 to 0.5 mole of an alkali metal sulfide per primary mole of the polyarylene sulfide.

The reaction temperature is usually 230° to 300° C., preferably 235° to 290° C., particularly preferably 240° to 280° C. When the reaction temperature is lower than 230° C., there are disadvantages that depolymerization and alkali metal thiolate formation are insufficient and that the reaction is prolonged, while when the reaction temperature is higher than 300° C., an abnormal reaction is liable to take place.

The reaction time is usually 0.2 to 30 hours, preferably 0.5 to 20 hours. When the reaction time is shorter than 0.2 hour, there is a fear that the reaction is incomplete, while a reaction time of longer than 30 hours is economically disadvantageous.

The amount of water coexisting with the polar organic solvent is usually 0.1 to 10 mole, preferably 0.2 to 7 mole per kg of the polar organic solvent. When the amount of water is less than 0.1 mole, there is a fear that the solubility of the alkali metal sulfide is insufficient, while when the amount is more than 10 mole, there is a fear that depolymerization and alkali metal thiolate formation are insufficient or an abnormal reaction takes place.

The amount of the polyarylene sulfide to be subjected to depolymerization is usually 0.1 to 5 primary mole, preferably 0.2 to 4 primary mole per kg of the polar organic solvent. When the amount of the polyarylene sulfide is less than 0.1 primary mole, productivity is lowered and an economic disadvantage is caused, while when the amount is more than 5 primary mole, there is a disadvantage that the viscosity during the reaction increases.

The amount of the alkali metal sulfide is usually 0.02 to 0.5 mole, preferably 0.025 to 0.3 mole, particularly preferably 0.03 to 0.2 mole per primary mole of the polyarylene sulfide. When the amount of the alkali metal sulfide is less than 0.02 mole, there is a fear that alkali metal thiolate formation is insufficient, while when the amount is more than 0.5 mole, the amount of the unreacted alkali metal sulfide increases.

It is desirable that the mixture containing the water-containing polar organic solvent, the polyarylene sulfide and the alkali metal sulfide is basic such that an aqueous solution obtained by diluting the mixture with water in an amount of 100 times the weight of the mixture has a pH of at least 9, preferably at least 10, particularly preferably at least 11. This is because when the pH value is lower than 9, there is a fear that depolymerization and alkali metal thiolate formation are insufficient, or a decomposition reaction takes place simultaneously.

Basic compounds can be added to the mixture to make the mixture basic to a desired value. The basic compound is used in an amount of usually 0.001 to 1 mole, preferably 0.005 to 1 mole per primary mole of the polyarylene sulfide. Examples of such basic compounds include alkali metal and alkaline earth metal hydroxides, oxides and carbonates. These basic compounds can be used singly or in admixture.

The reaction mixture containing an oligomer having an alkali metal thiolate group, that is, the reaction mixture (reaction solution) as formed can be used for the subsequent reaction with a carboxylating agent. Alternatively, the oligomer having an alkali metal thiolate group can be separated from the reaction mixture under non-oxidizing conditions and then used as the reaction component in the subsequent second step.

Second step: reaction step with carboxylating agent

After the polyarylene sulfide is depolymerized, the resulting oligomer is reacted with a carboxylating agent represented by $X-Ar-COOR''$ (wherein X represents a halogen atom; R'' represents a hydrogen atom, an alkyl group having 1 to 4 carbon atoms, an aryl group or an alkali metal atom; and Ar represents an arylene group) to obtain the bonding resin of the present invention.

Examples of the carboxylating agent include monohalogen-substituted arylcarboxylic acids such as o-chlorobenzoic acid, m-chlorobenzoic acid, p-chlorobenzoic acid, o-bromobenzoic acid, m-bromobenzoic acid and p-bromobenzoic acid; monohalogen-substituted arylcarboxylic acid esters such as methyl m-chlorobenzoate, ethyl p-chlorobenzoate and phenyl p-chlorobenzoate; and alkali metal salts of monohalogen-substituted arylcarboxylic acids such as sodium p-chlorobenzoate and sodium p-bromobenzoate.

It is assumed that the product obtained by the reaction with the carboxylating agent is mainly an arylene sulfide oligomer whose terminals are carboxylated, represented by the following formula (IV). It is considered that the reaction is a reaction of eliminating the alkali metal halide as shown in the following reaction formula (V).

$$R''OCO-Ar-S-(Ar-S)_y-Ar-COOR'' \qquad (IV)$$

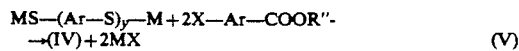

$$MS-(Ar-S)_y-M+2X-Ar-COOR''\\ \rightarrow (IV)+2MX \qquad (V)$$

wherein R'' represents a hydrogen atom, an alkyl group having 1 to 4 carbon atoms, an aryl group or an alkali metal atom.

The product obtained by the above reaction which is considered to be mainly composed of an arylene sulfide oligomer whose terminals are carboxylated is prepared from the starting materials obtained by depolymerization of the polyarylene sulfide with an alkali metal sulfide. Accordingly, the product has a narrow molecular weight distribution as measured by gel permeation chromatography (GPC). Namely, the weight average molecular weight/the number average molecular weight ratio is in the range of usually from 1.5 to 3.5, preferably from 1.8 to 3.0. The resin of the present invention is prepared from the oligomer. Hence, the preparation conditions of the resin can be easily controlled and a bonding resin having a uniform composition distribution can be easily obtained.

The carboxylating agent is used in an amount of usually 2 to 20 mole, preferably 2.1 to 10 mole, particularly preferably 2.2 to 5 mole per mole of the oligomer having an alkali metal thiolate group. When the amount of the carboxylating agent is less than 2 mole, arylene sulfide oligomers whose terminals are carboxylated are difficultly formed, while when the amount is more than 20 mole, there is an economic disadvantage. The molar number of the oligomer having an alkali metal thiolate group is defined as a molar number of the amount of the alkali metal sulfide obtained by subtracting the amount of the remaining alkali metal sulfide after the depolymerization from the amount of the alkali metal sulfide added in the preparation of the oligomer.

The reaction temperature is usually 50° to 300° C., preferably 100° to 280° C., particularly preferably 200° to 260° C. When the reaction temperature is higher than 300° C., there is a fear that decomposition due to an abnormal reaction occurs, while when the reaction temperature is lower than 50° C., the reaction is incomplete. The reaction time is usually 0.1 to 20 hours, preferably 0.2 to 15 hours, particularly preferably 0.5 to 10 hours. A reaction time of longer than 20 hours is not preferred from the viewpoint of productivity, while when the reaction time is shorter than 0.1 hour, there is a fear that the reaction is incomplete.

Examples of organic solvents which can be preferably used in the reaction of the oligomer having an alkali metal thiolate group with the carboxylating agent include.polar solvents such as amide compounds, lactam compounds, urea compounds and cyclic organophosphorus compounds; and the above-described polar organic solvents used in the first step of forming the oligomer having an alkali metal thiolate group. Specific examples of the organic solvents include N,N-dimethylacetamide, N,N-dimethylformamide, N-methylpyrrolidone, 1,3-dimethylimidazolidinone, N-methyl-ε-caprolactam, tetramethylurea and mixtures thereof. Particularly, polar organic solvents such as N-methylpyrrolidone and 1,3-dimethylimidazolidinone are preferred because they can be used in the first step as well as in the subsequent second step.

The organic solvent used in the second step may contain water. The reaction can be advantageously carried out under such conditions that up to 15 mole, preferably up to 10 mole per kg of the organic solvent, of water is present.

The oligomer having an alkali metal thiolate group is used in an amount of usually 0.001 to 5 mole, preferably 0.01 to 2 mole per kg of the organic solvent. When the amount is less than 0.001 mole, productivity is lowered and there is an economic disadvantage, while when the amount is more than 5 mole, the viscosity of the reaction mixture undesirably increases.

In the reaction of the oligomer having an alkali metal thiolate group with the carboxylating agent, it is desirable that the mixture is basic such that an aqueous solution obtained by diluting the mixture with water in an amount of 100 times the weight of the mixture has a pH of at least 9, preferably at least 10, particularly preferably at least 11. This is because when the pH is lower than 9, there is a fear that an abnormal reaction takes place. Therefore, the basic compound described for the first step is used in an amount of 0.001 to 21 mole, preferably 0.01 to 15 mole, particularly preferably 0.02 to 10 mole per mole of the oligomer having an alkali metal thiolate group. If desired, the mixture may optionally contain alkali metal sulfides, water, etc. in such an amount that the objects of the present invention are not adversely affected.

The arylene sulfide oligomer whose terminals are carboxylated, which is considered to be mainly formed in the second step, is obtained as a reaction mixture (reaction solution) containing the oligomer, the organic solvent, etc. But when the thus-obtained oligomer is used in the subsequent reaction step with an alkylenediol, it is not required to be in the form of a reaction mixture. Accordingly, the oligomer is usually separated from the reaction mixture containing the oligomer and then used as a part of the reaction component with the alkylenediol in the subsequent reaction step. The arylene sulfide oligomer whose terminals are carboxylated can be separated from the reaction mixture by conventional separation methods such as filtration and centrifugal separation.

Third step: reaction step with alkylenediol, etc.

In the third step, the arylene sulfide oligomer whose terminals are carboxylated is reacted with any one of the following reactant groups (1), (2) or (3).

(1) Alkylenediol
(2) Alkylenediol and polyester
(3) Alkylenediol and lactone

An alkylenediol having an average molecular weight of not more than 5,000 or an ester thereof can be preferably used because when the average molecular weight is more than 5,000, the reactivity is lowered. Particularly, ethylene glycol and 1,4-butanediol are preferred from the viewpoint of improving the solubility of the resulting bonding resin in solvents. Further, polyethylenediol, etc. are preferred from the viewpoint of increasing the flexibility of the resulting bonding resin. Examples of the alkylenediols include lower alkylenediols having an average molecular weight of about 60 to 200, such as ethylene glycol, 1,3-butanediol, 1,4-butanediol, 1,6-hexanediol and 1,10-decanediol; polyolefin diols such as polyethylenediol, hydrogenated products of polyisoprenediol and hydrogenated products of polybutadienediol; and monoesters and diesters of these diols with carboxylic acids such as formic acid and acetic acid.

When the alkylenediol alone is used in combination with neither polyester nor lactone, ethylene glycol and 1,4-butanediol are preferred from the viewpoint of improving the solubility of the resulting bonding resin in solvents. Further, polyethylenediol, etc. are preferred from the viewpoint of increasing the flexibility of the resulting bonding resin.

When the alkylenediol is used in combination with a polyester or a lactone, the alkylenediol plays a role in accelerating the progress of the reaction. When the alkylenediol is not used, the reaction does not proceed at a practical reaction rate. Particularly, lower alkylenediols are preferred.

The polyester used in the present invention is a homopolymer or copolymer having an ester linkage, or an ester linkage and an ether linkage, in the main chain thereof and has aromatic rings such as benzene rings or naphthalene rings in the repeating units thereof and an average molecular weight of 500 or more. When polyesters having an average molecular weight of less than 500 are used, it is difficult to increase the degree of polymerization of the resulting bonding resin. Examples of the polyester include polymers such as polyethylene terephthalate, polytetramethylene terephthalate and polyhexamethylene terephthalate, copolymers of aromatic polyesters with aliphatic polyethers and copolymers of aromatic polyesters with aliphatic polyesters. The latter copolymers are preferred form the viewpoint of improving the flexibility of the resulting bonding resin and the solubility of the resin in solvents.

Examples of the lactone include β-butyrolactone, δ-valerolactone, δ-caprolactone and ε-caprolactone.

Other components may coexist in the reaction system, so long as such components do not have an adverse effect on the reaction. For example, carboxylic acid components may coexist in addition to the arylene sulfide whose terminals are carboxylated. Examples of the carboxylic acid components include aliphatic dicarboxylic acids such as oxalic acid and adipic acid; alicyclic dicarboxylic acids such as 1,4-cyclohexanedicarboxylic acid and decahydro-2,6-naphthalenedicarboxylic acid; aromatic dicarboxylic acids such as terephthalic acid and 2,6-naphthalenedicarboxylic acid; and lower alkyl esters (such as methyl esters and ethyl esters), aryl esters (such as phenyl esters) and acid chlorides of these carboxylic acids.

The case where neither polyester nor lactone is used:

When neither polyester nor lactone is used, usually 0.1 to 5 mole, preferably 1.0 to 3 mole of the alkylenediol per mole of the carboxylic acid component is reacted in the presence of a catalyst at 150° to 350° C. for 0.2 to 30 hours.

When the alkylenediol used is a lower alkylenediol which can be distilled off during the reaction, the alkylenediol is used in an amount of usually 0.9 to 5 mole, preferably 1.0 to 3 mole per mole of the carboxylic acid component. When the alkylenediol used is a polyolefin diol which can be difficultly distilled off, the alkylenediol is used in an amount of usually 0.9 to 1.1 mole, preferably 0.95 to 1.05 mole, per mole of the carboxylic acid component. When the lower alkylenediol and the polyolefin diol are used in combination as the alkylenediol, the polyolefin diol is used in an amount of usually 0.1 to 1.1 mole, preferably 0.2 to 1.0 mole, and the total amount of the alkylenediol component used is in the range of usually 0.9 to 5 mole, preferably 1.0 to 3 mole, per mole of the carboxylic acid component.

The catalyst which can be used in the reaction include those which are conventionally used in the preparation of polyesters. Preferred examples of the catalyst include titanium catalysts, antimony catalysts, tin catalysts and germanium catalysts. These catalysts can be used either alone or as a mixture of two or more of them. The amount of the catalyst to be used is usually 0.005 to 0.5% by weight based on the total amount of the carboxylic acid component and the alkylenediol.

The reaction temperature must be higher than the melting point of the resulting bonding resin but lower than the decomposition temperature of the bonding resin. The reaction temperature is usually 150° to 350° C., preferably 200 to 320° C. The reaction time is usually 0.2 to 50 hours, preferably 0.5 to 30 hours. If desired, the thus-prepared bonding resin may be heated at 100° C. or higher but at a temperature of lower than the melting point of the bonding resin, whereby the degree of polymerization can be further increased.

The reaction can be advantageously carried out under reaction conditions conventionally used in the preparation of polyesters. For example, the reaction can be carried out under reaction conditions such as those in an inert gas (e.g., nitrogen or argon) atmosphere, those under reduced pressure and those in the absence of any solvent.

The case where the polyester is used:

When the polyester is used, the carboxylic acid component and the polyester are used in a weight ratio of usually 20:80 to 90:10, preferably 30:70 to 80:20, with the alkylenediol being used in an amount of 0.1 to 5 mole per mole of the carboxylic acid component, and the reaction is carried out in the presence of the catalyst at 150° to 350° C. for 0.2 to 30 hours.

When the alkylenediol used is a lower alkylenediol which can be distilled off during the reaction, the alkylenediol is used in an amount of 0.1 to 5 mole per mole of the carboxylic acid component. When the alkylenediol is a polyolefin diol, the alkylenediol is used in an amount of 0.1 to 1 mole per mole of the carboxylic acid component. When the lower alkylenediol and the polyolefindiol are used in combination, the polyolefindiol is used in an amount of 0.1 to 1.1 mole, and the total amount of the alkylenediol component used is preferably 0.1 to 5 mole, per mole of the carboxylic acid component. The catalyst, the polymerization temperature, the polymerization time, etc. are the same as those described above.

The case where the lactone is used:

When the lactone is used, the carboxylic acid component is first reacted with the alkylenediol according to the above-described procedure wherein neither lactone nor polyester is used, to thereby prepare a prepolymer. Subsequently, the prepolymer and the lactone are used in a weight ratio of usually 20:80 to 80:20, preferably 30:70 to 70:30.

The reaction of the prepolymer with the lactone may be carried out in the absence of a catalyst, but the reaction can be accelerated in the presence of a catalyst. Catalysts conventionally used in the polymerization of lactones can be used in the above reaction. Preferred examples of the catalysts include metal chelate catalysts, metal acylate catalysts, lead or manganese salts of organic acids and dibutyltin dichloride. The catalyst is used in an amount of usually not more than 0.2% by weight, preferably not more than 0.1% by weight based on the weight of the prepolymer. The polymerization temperature and the polymerization time are the same as those described above.

It is believed that the resin obtained in the third step has a main repeating unit represented by the following formula (VI).

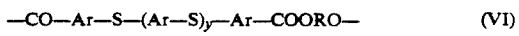
—CO—Ar—S—(Ar—S)$_y$—Ar—COORO— (VI)

In formula (VI), R is determined by another component to be reacted with the carboxylic acid component, is an organic residue having 2 or more carbon atoms, formed by removing one atom or one group attached to each of two carbon atoms among carbon atoms constituting either an aliphatic main chain or an aromatic ring and has at most a molecular weight corresponding to an oligomer, but is different from the arylene sulfide oligomer component block.

The major amount of the resin obtained in the third step can be dissolved in pyrrolidone solvents at a high temperature. The term "be dissolved" or "dissolution" as used herein refers to such a state that when the resin, i.e., the adhesive, is left to stand at room temperature for one day and then at a temperature of 5° C. lower than the boiling point of the pyrrolidone solvent in a constant temperature bath for 30 minutes, the resin can pass through a filter paper (No. 5A, manufactured by Toyo Roshi KK) and that the resin is visually uniform and transparent or semitransparent throughout the test tube. The term "major amount" as used herein refers to that the ratio of the amount of a residue obtained by further removing the remaining solvent from the residue on the filter paper obtained in the above test method to the amount of the resin before the addition of the solvent is less than 50% by weight. The ratio is preferably not more than 25% by weight, more preferably not more than 10% by weight.

The above-described resin together with a pyrrolidone solvent can be used as an adhesive for polyarylene sulfides from the above finding. The adhesive for polyarylene sulfides according to the present invention comprises the resin and the pyrrolidone solvent.

There is no particular limitation with regard to the amount of the resin to be contained in the adhesive of the present invention, so long as the major amount of the resin is dissolved in the pyrrolidone solvent.

The term "pyrrolidone solvent" as used herein refers to a compound having one or two nitrogen atoms of a five-membered ring, a boiling point lower than the crystalline melting points of the p-arylene sulfide polymers and such a structure that the carbon atom adjacent to the nitrogen atom forms a carbonyl group, or a mixed solvent mainly composed of said compound. Hydrogen atom is not always bonded to the nitrogen atom, but a substituent group may be bonded to the nitrogen atom. Preferably, 1-methyl-2-pyrrolidone (commonly called N-methyl-2-pyrrolidone, hereinafter abbreviated to NMP) and 1,3-dimethyl-2-imidazalidinone (hereinafter abbreviated to DMI) can be used.

Molded polyarylene sulfide articles to be bonded in the present invention refer to high-molecular materials wherein the main constituent element of the surface layer to be bonded comprises —Ar—S—, or compositions containing the same as a main component.

The arylene group in the molded articles is used in the same sense as the arylene group in the adhesive, but may be not always the same as the arylene group in the bonding resin.

The interior of the molded polyarylene sulfide article may be mainly composed of an inorganic material such as glass cloth, according to the above definition. The term "main constituent element" as used herein means that at least 50% by weight is composed of —Ar—S—. The content of —Ar—S— is preferably at least 70% by weight, more preferably at least 90% by weight. The term "main component" used in connection with the molded articles described above means that the amount of a polymer having —Ar—S— as the main constituent element is at least 50% by weight, preferably at least 70% by weight, more preferably at least 90% by weight. The shape of the molded polyarylene sulfide articles is not particularly limited.

The adhesive composed of the above-described combination according to the present invention can be applied by a very simple method. First, the molded polyarylene sulfide article is coated with the adhesive of the present invention. When the whole of the bonding resin of the present invention is dissolved in the pyrrolidone solvent at a temperature of 5° C. lower than the boiling point of the solvent, the coating is carried out at a temperature at which the polymer is dissolved. When the bonding resin of the present invention contains a portion which is not dissolved in the pyrrolidone solvent at a temperature of at least 5° C. lower than the boiling point thereof, the bonding resin must be molten after the coating, though there is no particular limitation with regard to the coating temperature thereof. The temperature at which the resin is molten is a temperature higher than the crystalline melting point of the bonding resin, but the upper limit of the temperature is a temperature at which a part of the polyarylene sulfide constituting the adherend surface is molten. When the coating temperature is too low, there is a possibility that the adhesive of the present invention somewhat causes gelation. In this case, it is desirable that the coating is carried out through a screen to effect uniform coating.

After the coating, the solvent is removed. There is no particular limitation with regard to the removal method of the solvent. For example, the removed of the solvent may be conducted by drying under reduced pressure or at atmospheric pressure, or by heating. The bonding resin of the present invention usually has a crystalline melting point. When the resin has such a crystalline melting point and is not heated at a temperature of not lower than the crystallization temperature of the resin in any stages of the coating stage, the solvent removal stage, and before the use, it is desirable that the resin is heated at a temperature of not lower than the crystallization temperature of the resin in any one stage after the coating, to crystallize the resin. The resin exhibits good adhesion by such simple removal of the solvent. However, when the resin is heated at a temperature of higher than the crystalline melting point of the resin but not higher than a temperature at which a part of the polyarylene sulfide in the adherend resin is molten, preferably lower than the crystalline melting point after the removal of the solvent, or simultaneously with the removal of the solvent, the adhesion can be further increased.

When the adhesive of the present invention is mixed with an electrically conductive powder, it can be used as an electrically conductive paste. When the adhesive is mixed with carbon powders, it can be used as a resistance paste. When the adhesive is not mixed with any material or is mixed with additives such as a viscosity modifier, it can be used as an insulating paste.

Of course, the former two pastes may contain additives such as a viscosity modifier.

The present invention is now illustrated in greater detail by reference to the following Examples which, however, are not to be construed as limiting the present invention in any way.

Evaluation method of physical properties (1) Crystalline melting point and glass transition temperature With regard to the oligomers, powders as polymerized were used as samples. Other polymers were hot-pressed at 200° to 350° C. and then quenched to prepare sheets of about 0.5 mm in thickness. The sheets were used as samples. The crystalline melting point and the glass transition temperature were measured with a differential scanning calorimeter (DSC, manufactured by Metler Co.) by heating the samples at a heating rate of 10° C./min from room temperature in a nitrogen gas atmosphere. When a plurality of heat absorption peaks due to the fusion of the crystal were found, the predominant peak value was referred to as the crystalline melting point.

(2) Melt viscosity

Using a viscoelasticity measuring apparatus (DYNAMIC SPECTROMETER, manufactured by Rheometrics), the viscosity at a temperature of 20° C. higher than the crystalline melting point measured with DSC was measured at a frequency of 10 rad/sec and a strain of 10%.

(3) Number-average molecular weight and molecular weight distribution

The number average molecular weight and the molecular weight distribution were determined by GPC. The measuring conditions were as follows.
Column: two SHODEX AT80M/S columns in series
Solvent: α-chloronaphthalene
Flow rate: 0.7 ml/min
Temperature: 220° C.
Concentration of sample: 0.05 % by weight
Amount of sample introduced: 200 μl
Detector: Hydrogen flame ionization detector (FDI)
Calibration of molecular weight:
 standard polystyrene and the following compound

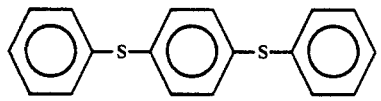

Data processing: SIC 7000B (manufactured by System Instrument Co.)

(4) Solubility

One gram of a copolymer obtained in each Example was weighed, and 9 g of a solvent used is each Example was added thereto. The mixture was left to stand at room temperature for one day and then at a temperature of 5° C. lower than the boiling point of the solvent in a constant temperature bath for 30 minutes. Subsequently, the resulting mixture was filtered through a filter paper [No. 5A (retention particle size in the catalog: 8 μm) manufactured by Toyo Roshi KK]. The solvent was removed from the residue. The solubility was evaluated in 4 grades described below. The solvent used was a reagent.

A: Uniformly dissolved.
B: The major amount was dissolved, and the remainder was not dissolved.
C: 50 to 80% by weight was not dissolved, and the remainder was dissolved.
D: 80% by weight or more was not dissolved.

(5) Adhesion

Polyphenylene sulfide was molded into a disc of 24 mmφ and 3 mm in thickness at 300° C. The molded article was coated with the adhesive of the present invention. The coating temperature was a temperature of 5° C. lower than the boiling point of the solvent or room temperature as shown in Table 1. After coating, the solvent was dried under reduced pressure, and either the coated sample was heated to a temperature of not lower than the crystalline melting point of the copolymer constituting the adhesive, or the coated sample was not heated, as shown in Table 1. In both cases, a film of about 50 μm in thickness was formed. The end of the film was previously peeled off, and the film was then examined whether the remainder of the film could be peeled off by means of a pincette. Evaluation was made in the following 6 grades.

A: Not peeled off.
B: Difficultly peeled off.
C: There was a possibility that a part of the film was peeled off when a considerably high-intensive force was applied thereto.
D: A part of the film was peeled off by a light force.
E: The film was peeled off by a light force.
F: A uniform film was not formed.

REFERENTIAL EXAMPLE 1

Preparation of polyphenylene sulfide

Into a titanium-lined autoclave were charged 7.00 kg of NMP (N-methylpyrrolidone) and 3.03 kg (18.0 mole, water content: 53.6% by weight) of hydrated sodium sulfide. After purging with a nitrogen gas, the temperature was gradually elevated to 200° C. to distill 2.02 kg of an NMP solution containing 1.32 g of water and 0.41 mole of hydrogen sulfide.

A mixed solution of 2.65 kg (18.0 mole) of p-dichlorobenzene, 240 g (13.3 mole) of water and 3.70 kg of NMP was then fed thereto, and the mixture was reacted at 220° C. for 5 hours. Further, 720 g (40.0 mole) of water was introduced thereinto under pressure, the temperature was elevated to 255° C., and the mixture was reacted for 3 hours. The resulting reaction mixture was screened. The resulting particulate polymer was separated, washed three times with acetone and three times with water, dehydrated and then dried at 100° C. to obtain the desired polyphenylene sulfide as white granules.

The resulting polyphenylene sulfide had a melt viscosity of about 3,700 poises at 301° C., a crystalline melting point of 281° C., a glass transition temperature of 86° C., a number average molecular weight of about 11,000 in terms of polystyrene and a ratio of the weight average molecular weight to the number average molecular weight of 5.3.

REFERENTIAL EXAMPLE 2

Preparation of carboxylated arylene sulfide oligomer (ASO-1)

In a titanium-lined autoclave were stirred 972 g (9.00 primary mole) of the polyphenylene sulfide obtained in Referential Example 1, 9.6 kg of NMP, 302 g (1.80 mole, water content: 53.6% by weight) of hydrated sodium sulfide, 37.2 g (0.930 mole) of sodium hydroxide, 18.6 g (0.251 mole) of calcium hydroxide and 184 g (10.2 mole) of water to obtain a dispersion. An aqueous dispersion obtained by diluting the dispersion with water in an amount of 100 times the weight of the dispersion had a pH of not lower than 11. The dispersion was heated at 250° C. for 2 hours while stirring in a nitrogen gas atmosphere to depolymerized the polyphenylene sulfide such that it was converted into a compound having a sodium thiolate group at each of the terminals of its molecular chain. A very small amount of the reaction mixture (solution) was sampled, and the amount of $S^{2-}$ was determined by means of ion chromatography. It was found that the amount of unreacted sodium sulfide left was 7.6% by weight based on the amount of sodium sulfide initially charged.

The reaction mixture contained 1.66 mole of an oligomer having a sodium thiolate group and 0.14 mole of sodium sulfide. To the reaction mixture were added 936 g (5.96 mole) of p-chlorobenzoic acid, 342 g (8.55 mole) of sodium hydroxide and 900 g (49.8 mole) of water (an aqueous solution obtained by diluting the resulting mixed solution with water in an amount of 100 times that of the mixed solution had a pH of not lower than 11). The mixed solution was reacted at 255° C. for 2 hours. The autoclave was cooled, and the contents were taken out, introduced into a large amount of water, neutralized with hydrochloric acid and thoroughly washed with water. A white solid was recovered as a wet cake by filtration. The wet cake was dried at 100° C. overnight, and Soxhlet extraction was carried out with a mixed solution of acetone/benzene (1/1 by volume) for one day. The extract was dried at 30° C. under reduced pressure overnight to obtain a product as a white powder.

The infrared absorption spectrum of the product showed that absorption in the vicinity of 1690 cm$^{-1}$ due to the carbonyl group of the carboxylic acid was observed.

The product had a number average molecular weight of 520 in terms of polystyrene and a ratio of the weight average molecular weight to the number average molecular weight of 2.0 as measured by GPC. The product had a crystalline melting point of 250° C.

It is believed that the product is considered to be a carboxylated arylene sulfide oligomer (hereinafter abbreviated to ASO-1) having the following structure from the above-described IR and GPC analyses and elemental analysis.

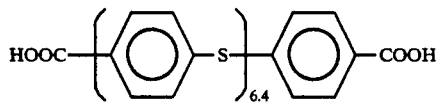

REFERENTIAL EXAMPLE 3

Preparation of carboxylated arylene sulfide oligomer (ASO-2)

Into a titanium-lined autoclave were charged 972 g (9.00 primary mole) of the polyarylene sulfide prepared in Referential Example 1, 9.60 kg of NMP, 151 g (0.899 mole, water content: 53.6% by weight) of hydrated sodium sulfide, 48.0 g (1.20 mole) of sodium hydroxide, 48.0 g (0.649 mole) of calcium hydroxide and 265 g (14.7 mole) of water to prepare a dispersion. A very small amount of a sample obtained from the dispersion was diluted with water in an amount of 100 times the weight of the sample. The resulting aqueous dispersion had a pH of not lower than 11. The dispersion was heated at 250° C. for 2 hours while stirring in a nitrogen gas atmosphere to carry out depolymerization and a reaction of sodium thiolate formation. It was found that no sodium sulfide was left as an unreacted material in the reaction mixture (solution).

The reaction mixture contained 0.90 mole of an oligomer having a sodium thiolate group. To the reaction mixture were added 376 g (2.39 mole) of p-chlorobenzoic acid, 192 g (4.80 mole) of sodium hydroxide and 900 g (49.8 mole) of water (an aqueous solution obtained by diluting the resulting mixed solution with water in an amount of 100 times that of the mixed solution had a pH of not lower than 11). In the same manner as in Referential Example 2, a product was obtained as a white powder.

The product had a number average molecular weight of 790 in terms of polystyrene and a ratio of the weight average molecular weight to the number average molecular weight of 2.1 as measured by means of GPC. The product had a crystalline melting point of 260° C.

The infrared absorption spectrum of the product showed that absorption at 1690 cm$^{-1}$ due to the carbonyl group of the carboxylic acid was found.

The product is considered to be a carboxylated arylene sulfide oligomer (hereinafter abbreviated to ASO-2) having the following structure from the above-described IR and GPC analyses and elemental analysis.

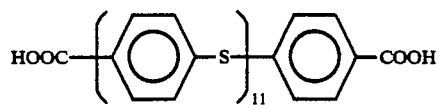

REFERENTIAL EXAMPLE 4

Preparation of carboxylated arylene sulfide oligomer (ASO-3)

Into a titanium-lined autoclave were charged 972 g (9.00 primary mole) of polyarylene sulfide prepared in Referential Example 1, 9.60 kg of NMP, 75.2 g (0.448 mole, water content: 53.6% by weight) of hydrated sodium sulfide, 66.0 g (1.65 mole) of sodium hydroxide, 33.0 g (0.446 mole) of calcium hydroxide and 305 g (16.9 mole) of water. The mixture was stirred at room temperature to prepare a dispersion. A very small amount of a sample obtained from the dispersion was diluted with water in an amount of 100 times the weight of the sample. The resulting dispersion had a pH of not lower than 11. The dispersion was heated at 250° C. for 2 hours while stirring in a nitrogen has atmosphere to carry out depolymerization and a reaction of sodium thiolate formation. It was found that no sodium sulfide was left as an unreacted material in the reaction mixture (solution).

The reaction mixture contained 0.45 mole of an oligomer having a sodium thiolate group. To the reaction mixture were added 235 g (1.50 mole) of p-chlorobenzoic acid, 84.0 g (2.10 mole) of sodium hydroxide and 900 g (49.8 mole) of water (an aqueous dispersion obtained by diluting the resulting dispersion with water in an amount of 100 times that of the dispersion had a pH of not lower than 11). In the same manner as in Referential Example 2, a product was obtained as a white powder.

The product had a crystalline melting point of 277° C. The product had a number average molecular weight of 1760 in terms of polystyrene and a ratio of the weight average molecular weight to the number average molecular weight of 2.7 as measured by means of GPC. The product had a melt viscosity of 20 poises as measured at 297° C.

The infrared absorption spectrum of the product showed that absorption at 1690 cm$^{-1}$ due to the carbonyl group of the carboxylic acid was found.

The product is considered to be a carboxylated arylene sulfide oligomer (hereinafter abbreviated to ASO-3) having the following structure from the above-described GPC and IR analyses and elemental analysis.

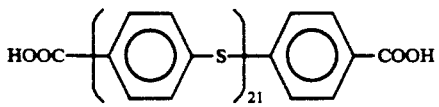

EXAMPLE 1

Preparation of polyester

Into a reactor equipped with a stirrer, a distillation tube and a nitrogen-introducing tube were charged 15.0 g (0.0772 mole) of dimethyl terephthalate, 10.5 g (0.169 mole) of ethylene glycol and 0.025 g ($1.4 \times 10^{-4}$ mole) of calcium acetate monohydrate as a catalyst and 0.010 g ($3.4 \times 10^{-5}$ mole) of antimony oxide as a catalyst. The mixture was reacted with stirring for 2 hours while gradually elevating the temperature in a nitrogen gas atmosphere (10 ml/min) to 180° to 200° C., and methanol formed was removed. After it was confirmed that a nearly theoretical amount of methanol was recovered, the temperature was elevated to 220° C., and the reaction was carried out for about one hour. An excess amount of ethylene glycol was removed. Subsequently, the temperature was gradually elevated to 280° C. After the temperature reached 280° C., the pressure was gradually reduced finally to 0.5 mmHg or lower, and a condensation reaction was carried out for 3 hours. A nearly theoretical amount of ethylene glycol distilled during the course of the reaction was recovered.

After the completion of the reaction, the temperature was lowered to 240° C., the pressure was restored to atmospheric pressure, and the reactor was opened. To the reactor was added 15.0 g (0.130 mole) of ε-caprolactone, and a block copolymerization reaction was carried out in a nitrogen gas atmosphere (10 ml/min) for 3 hours. There was obtained a polyester as a white bulky material. The polyester had a glass transition temperature of −48° C., a crystalline melting point of 172° C. and a melt viscosity of about 7,200 poises (as measured at 192° C.).

Preparation of bonding resin

Subsequently, 10.0 g of the polyester prepared above, 10.0 g ($7.66 \times 10^{-3}$ mole) of ASO-2, 0.60 g ($9.7 \times 10^{-3}$ mole) of ethylene glycol and 0.010 g ($2.9 \times 10^{-5}$ mole) of tetra-n-butoxy titanate as a catalyst were charged into a reactor, and the mixture was reacted with stirring for 2 hours while gradually elevating the temperature to 180° to 200° C. in a nitrogen gas atmosphere (10 ml/min). The mixture was then reacted at 300° C. and 160 mmHg for 0.25 hours while gradually reducing the pressure and elevating the temperature. Immediately thereafter, the temperature was lowered to 280° C., the degree of vacuum was gradually increased, and the mixture was heated finally at 0.5 mmHg or lower to thereby carry out an ester exchange reaction, thus obtaining a dark brown bulky product.

The infrared absorption spectrum of the product showed that absorption in the vicinity of 1720 cm$^{-1}$ due to the carbonyl group of the ester was found and shifted to a higher frequency side than that of absorption at 1690 cm$^{-1}$ due to the carbonyl group of the carboxylic acid of ASO-2. This showed that an ester linkage was introduced into the main chain of ASO-2. Further, absorption at 820 cm$^{-1}$ due to the phenylene sulfide group was observed. The product had a glass transition temperature of 8° C., a crystalline melting point of 256° C. and a melt viscosity of 429 poises (as measured at 276° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 2

Preparation of polyester

Into the same reactor as used in Example 1 were charged 15.0 g (0.0903 mole) of terephthalic acid, 9.80 g (0.109 mole) of 1,4-butanediol and 0.010 g ($2.9 \times 10^{-5}$ mole) of tetra-n-butoxy titanate as a catalyst. The mixture was reacted with stirring for 1.5 hours while gradually elevating the temperature to 180° to 200° C. in a nitrogen gas atmosphere (10 ml/min). After the reaction was carried out at 220° for an additional 2 hours, the temperature was gradually elevated to 250° C., and the pressure was gradually reduced. After the temperature reached that temperature, the degree of vacuum was further increased, and a condensation reaction was carried out finally under 0.5 mmHg or lower for 3 hours. A nearly theoretical amount of excessive 1,4-butanediol distilled during the course of the reaction was recovered.

After the completion of the reaction, the pressure was restored to atmospheric pressure at 230° C., and 15.0 g (0.13 mole) of εcaprolatone was added. A block copolymerization reaction was carried out in a nitrogen gas atmosphere (10 ml/min) for 3 hours. There was obtained a polyester as a white bulky material.

The polyester had a glass transition temperature of −51° C., a crystalline melting point of 132° C. and a melt viscosity of about 5400 poises (as measured at 152° C.).

Subsequently, 10.0 g of the polyester prepared above, 10.0 g ($7.66 \times 10^{-3}$ mole) of ASO-2, 0.60 g ($9.7 \times 10^{-3}$ mole) of ethylene glycol and 0.010 g ($2.9 \times 10^{-5}$ mole) of tetra-n-butoxy titanate as a catalyst were charged into a reactor. Subsequently, in the same manner as in the preparation of the copolymer in Example 1, a dark brown bulky polyarylene sulfide copolymer was obtained. A liquid material distilled during the course of the reaction was removed from the reaction system to the outside.

The infrared absorption spectrum of the product showed that absorption due to the carbonyl group of the ester and absorption due to the phenylene sulfide group were observed at 1720 cm$^{-1}$ and 820 cm$^{-1}$ respectively. The product had a glass transition temperature of 6.0° C., a crystalline melting point of 257° C. and a melt viscosity of 380 poises (as measured at 277° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 3

Into the same reactor as used in Example 1 were charged 50.0 g of a commercially available polyester-based thermoplastic elastomer [a copolymer of polybutylene terephthalate and poly-ε-caprolactone, glass transition temperature: −56° C., crystalline melting point: about 200° C., trade name: Pelprene S1001, manufactured by Toyobo Co., Ltd.], 50 g of ASO-1, 3.20 g (0.052 mole) of ethylene glycol and 0.050 g ($1.5 \times 10^{-4}$ mole) of tetra-n-butoxy titanate as a catalyst. In the same manner as in the preparation of the copolymer in Example 1, a dark brown copolymer was obtained. A liquid material distilled during the course of the reaction was removed from the reaction system to the outside.

The infrared absorption spectrum of the product showed that absorption in the vicinity of 1720 cm$^{-1}$ due to the carbonyl group of the ester was observed and shifted to a higher frequency side than that of absorption at 1690 cm$^{-1}$ due to the carbonyl group of the carboxylic acid of ASO-1 used as the starting material. Further, absorption in the vicinity of 820 cm$^{-1}$ due to the phenylene sulfide group was observed. The product had a glass transition point of 5° C., a crystalline melting point of 224° C. and a melt viscosity of 630 poises (as measured at 244° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 4

Into the same reactor as used in Example 1 were charged 150 g of a commercially available polyester-based thermoplastic elastomer [glass transition temperature of $-56°$ C., crystalline melting point: about 200° C., trade name: Pelprene S1001, manufactured by Toyobo Co., Ltd.], 150 g of ASO-2, 8.94 g (0.144 mole) of ethylene glycol and 0.30 g ($8.8 \times 10^{-4}$ mole) of tetra-n-butoxy titanate as a catalyst. Subsequently, the reaction was carried out in the same manner as in Example 3. There was obtained a dark brown bulky product.

The infrared absorption spectrum of the product showed that absorption in the vicinity of 1720 cm$^{-1}$ due to the carbonyl group of the ester and absorption in the vicinity of 820 cm$^{-1}$ due to the phenylene sulfide group were observed. The product had a glass transition temperature of 7° C., a crystalline melting point of 266° C. and a melt viscosity of 660 poises (as measured at 286° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 5

The procedure of Example 4 was repeated, except that the coating temperature was room temperature and that after coating, only the solvent was removed under reduced pressure while the copolymer was not molten, as illustrated in the item of the adhesion described above. The conditions and results are shown in Table 1.

EXAMPLE 6

The procedure of Example 4 was repeated, except that after coating, only the solvent was removed while heating to melt the copolymer was not conducted, as illustrated in the item of the adhesion described above. The conditions and results are shown in Table 1.

EXAMPLE 7

The procedure of Example 4 was repeated, except that the coating temperature was room temperature. The conditions and results are shown in Table 1.

EXAMPLE 8

Into the same reactor as used in Example 1 were charged 50.0 g of a commercially available polyester-based thermoplastic elastomer [glass transition temperature: $-56°$ C., crystalline melting point: about 200° C., trade name: Pelprene S1001, manufactured by Toyobo Co., Ltd.], 50.0 g of ASO-3, 2.98 g (0.0484 mole) of ethylene glycol and 0.050 g ($1.5 \times 10^{-4}$ mole) of tetra-n-butoxy titanate as a catalyst. Subsequently, the reaction was carried out in the same manner as in Example 3. There was obtained a dark brown bulky product.

The infrared absorption spectrum of the product showed that absorption in the vicinity of 1720 cm$^{-1}$ due to the carbonyl group of the ester and absorption in the vicinity of 820 cm$^{-1}$ due to the phenylene sulfide were observed. The product had a glass transition temperature of 38° C., a crystalline melting point of 274° C. and a melt viscosity of 720 poises (as measured at 294° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 9

The procedure of Example 8 was repeated, except that DMI (1,3-dimethylimidazolidinone) was used in place of NMP used as the solvent in Example 8.

The conditions and characteristics of an adhesive comprising 10 parts by weight of the copolymer and 90 parts by weight of DMI are shown in Table 1.

EXAMPLE 10

The ester exchange reaction was repeated in the same manner as in Example 4, except that Pelprene S3001 (glass transition point: about $-35°$ C., crystalline melting point: about 215° C. manufactured by Toyobo Co., Ltd.) was used in place of Pelprene S1001 used in Example 4. There was obtained a dark brown bulky product.

The infrared absorption spectrum of the product showed that absorption in the vicinity of 1720 cm$^{-1}$ due to the carbonyl group of the ester and absorption in the vicinity of 820 cm$^{-1}$ due to the phenylene sulfide group were observed. The product had a glass transition temperature of 20° C., a crystalline melting point of 256° C. and a melt viscosity of 400 poises (as measured at 276° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

EXAMPLE 11

The reaction was repeated in the same manner as in Example 4, except that the amounts of Pelprene S1001 and ASO-2 charged were changed to 75 g and 225 g, respectively. There was obtained a dark brown bulky product.

The infrared absorption spectrum of the product showed that absorption in the vicinity of 1720 cm$^{-1}$ due to the carbonyl group of the ester and absorption in the vicinity of 820 cm$^{-1}$ due to the phenylene sulfide group were observed. The product had a glass transition temperature of 43° C. a crystalline melting point of 258° C.

and a melt viscosity of 510 poises (as measured at 278° C.). It was confirmed from these characteristics that the product was considered to be an arylene sulfide copolymer.

The conditions and characteristics of an adhesive comprising 10 parts by weight of the copolymer and 90 parts by weight of NMP are shown in Table 1.

COMPARATIVE EXAMPLE 1

A random copolymer comprising 90 mole % of p-phenylene sulfide and 10 mole % of m-phenylene sulfide was prepared in the same manner as in Referential Example 1, except that a mixture of 2.385 kg (16.2 mole) of p-dichlorobenzene and 0.265 kg (1.80 mole) of m-dichlorobenzene was used in place of 2.65 kg (18.0 mole) of p-dichlorobenzene. The random copolymer had a crystalline melting point of 256° C.

The conditions and characteristics of an adhesive comprising 10 parts by weight of the copolymer and 90 parts by weight of NMP are shown in Table 1.

COMPARATIVE EXAMPLE 2

The characteristics of an adhesive comprising 5 parts by weight of the polyester-based thermoplastic elastomer (Pelprene S1001 used in Example 8) and 95 parts by weight of NMP are shown in Table 1.

While the invention has been described in detail and with reference to specific embodiments thereof, it will be apparent to one skilled in the art that various changes and modifications can be made therein without departing from the spirit and scope thereof.

What is claimed is:

1. An adhesive for bonding polyarylene sulfides, which comprises (i) a copolymer wherein a main constituent element of the repeating unit of the copolymer is —A—Z—R—Z—, wherein —Z— is an ester linkage; A is an arylene sulfide oligomer component block comprising one or more arylene groups; and R is an organic compound residue formed by removing one atom or one group attached to each of two carbon atoms among carbon atoms constituting either an aliphatic main chain or an aromatic ring and has at most a molecular weight corresponding to an oligomer, but is different from A, and (ii) a pyrrolidone solvent.

2. The adhesive for bonding polyarylene sulfides as in claim 1, wherein A is selected from the group consisting of

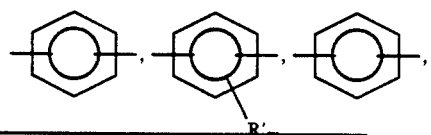

TABLE 1

| | | Characteristics of polymer | | | Solubility at temperature lower by 5° C. than the boiling point of solvent | Coating temperature (°C.) | Coated polymer after coating was molten or not | Adhesion to polyphenylene sulfide |
|---|---|---|---|---|---|---|---|---|
| | | Crystalline melting point (°C.) | Content of p-phenylene sulfide (wt %) | Solvent | | | | |
| Example | 1 | 256 | 50 | NMP | A | 197 | molten | A |
| | 2 | 257 | 50 | NMP | A | 197 | molten | A |
| | 3 | 224 | 50 | NMP | A | 197 | molten | A |
| | 4 | 266 | 50 | NMP | A | 197 | molten | A |
| | 5 | 266 | 50 | NMP | A | room temp. | not molten | B |
| | 6 | 266 | 50 | NMP | A | 197 | not molten | B |
| | 7 | 266 | 50 | NMP | A | room temp. | molten | A |
| | 8 | 274 | 50 | NMP | B | 197 | molten | A |
| | 9 | 274 | 50 | DMI | B | 220 | molten | A |
| | 10 | 256 | 50 | NMP | A | 197 | molten | A |
| | 11 | 258 | 75 | NMP | B | 197 | molten | A |
| Comp. EX. | 1 | 256 | 90 | NMP | C | room temp. | molten | F |
| | 2 | 200 | 0 | NMP | C | 197 | molten | C |

It will be understood from the above disclosure that the bonding resins of the present invention have high solubility in pyrrolidone solvents. When the resins are heated to a temperature of not lower than the crystallization temperature thereof, they have a crystalline melting point and high heat resistance. Further, when the bonding method described above is applied to molded polyarylene sulfide articles, the resins of the present invention in the form of a thin film can be bonded to the surfaces of the molded polyarylene sulfide articles as adherend resins.

When adhesives of the present invention which comprise the resin of the present invention and a pyrrolidone solvent are applied to crystalline polyarylene sulfides having high solvent resistance, the adhesives exhibit good adhesion of the evaluation grade A or B according to the evaluation method described in the Examples. Further, the adhesives of the present invention have a proper viscosity and, hence, the adhesives can be used in many fields, for example, in the field of printed boards as pastes such as electrically conductive pastes, electrically insulating pastes and resistance pastes.

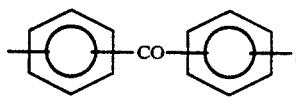

and

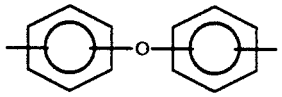

wherein m is an integer of 1 to 4, and R' is selected from the group consisting of an alkyl group having no more than six carbon atoms, an alkoxy group having no more than 6 carbon atoms, a phenyl group, a carboxyl group, a cyano group and a nitro group; and R is selected from the group consisting of a component block mainly composed of an aromatic oligoester and an aliphatic ester, a component block mainly composed of an aromatic oligoester and an aliphatic ether and a residue formed by removing two hydrogen atoms from both terminals of the main chain of a paraffin having a molecular weight of about 60 to 200.

3. The adhesive for bonding polyaryelene sulfides as in claim 1, wherein A is p-phenylene sulfide.

4. The adhesive for bonding polyarylene sulfides as in claim 1, wherein said main constituent element comprises mainly a repeating unit represented by formula (VI):

$$-CO-Ar-S-(Ar-S)_y-Ar-COORO- \qquad (VI)$$

wherein Ar represents an arylene group and y represents a positive number sufficient to provide at least 50% by weight (Ar—S) in said main constituent element.

* * * * *